US006876775B2

(12) United States Patent  (10) Patent No.: US 6,876,775 B2
Torunoglu  (45) Date of Patent: Apr. 5, 2005

(54) TECHNIQUE FOR REMOVING BLURRING FROM A CAPTURED IMAGE

(75) Inventor: Ilhami H. Torunoglu, Monte Sereno, CA (US)

(73) Assignee: Canesta, Inc., San Jose, CA (US)

( * ) Notice: Subject to any disclaimer, the term of this patent is extended or adjusted under 35 U.S.C. 154(b) by 61 days.

(21) Appl. No.: 10/079,196

(22) Filed: Feb. 19, 2002

(65) Prior Publication Data

US 2002/0114531 A1 Aug. 22, 2002

Related U.S. Application Data

(60) Provisional application No. 60/269,731, filed on Feb. 16, 2001.

(51) Int. Cl.[7] .......................... G06K 9/40; G03B 13/00; G03B 27/52; G11B 3/74
(52) U.S. Cl. ...................... 382/255; 348/345; 355/55; 369/89
(58) Field of Search ................................. 382/255, 266; 396/89; 250/201.2–201.8; 348/345–357; 355/55–63

(56) References Cited

U.S. PATENT DOCUMENTS

| 3,857,022 | A | 12/1974 | Rebane et al. |
|---|---|---|---|
| 4,187,492 | A | 2/1980 | Deligneres |
| 4,312,053 | A | 1/1982 | Lipsky |
| 4,333,170 | A | 6/1982 | Mathews et al. |
| 4,376,301 | A | 3/1983 | Roberts |
| 4,686,655 | A | 8/1987 | Hyatt |
| 4,716,542 | A | 12/1987 | Peltz et al. |
| 4,956,824 | A | 9/1990 | Sinderband et al. |
| 4,980,870 | A | 12/1990 | Spivey et al. |
| 5,056,791 | A | 10/1991 | Poillon et al. |
| 5,099,456 | A | 3/1992 | Wells |
| 5,166,905 | A | 11/1992 | Currie |
| 5,174,759 | A | 12/1992 | Preston et al. |
| 5,193,124 | A | * 3/1993 | Subbarao .................... 382/255 |
| 5,291,300 | A | * 3/1994 | Ueda ......................... 386/117 |
| 5,459,542 | A | * 10/1995 | Fujiwara et al. .............. 396/55 |
| 5,510,894 | A | * 4/1996 | Batchelder et al. ......... 356/301 |
| 5,534,991 | A | * 7/1996 | Maeda et al. .............. 356/3.06 |
| 5,573,077 | A | 11/1996 | Knowles |
| 5,576,975 | A | * 11/1996 | Sasaki et al. ............... 382/106 |
| 5,617,371 | A | 4/1997 | Williams |
| 5,825,033 | A | 10/1998 | Barrett et al. |
| 6,002,435 | A | 12/1999 | Yamamoto et al. |
| 6,201,517 | B1 | * 3/2001 | Sato ............................ 345/7 |

FOREIGN PATENT DOCUMENTS

| EP | 0233464 A1 | 8/1987 |
|---|---|---|
| EP | 042500 A2 | 4/1991 |
| EP | 0629964 A1 | 12/1994 |
| EP | 0982676 A1 | 3/2000 |
| EP | 1039365 A2 | 9/2000 |
| EP | 1045586 A2 | 10/2000 |
| WO | WO 84/00427 A1 | 2/1984 |
| WO | WO 00/19705 A1 | 4/2000 |

OTHER PUBLICATIONS

International Search Report, Oct. 21, 2002.
International Preliminary Examination Report, Oct. 20, 2003.

(Continued)

Primary Examiner—Mehrdad Dastouri
(74) Attorney, Agent, or Firm—Shemwell Gregory & Courtney LLP

(57) ABSTRACT

A technique is provided for removing blurring from an image captured by an imaging device. The imaging device may include a lens and an imaging medium comprised of a plurality of imaging pieces. According to an embodiment, a distance is determined between individual imaging pieces of the imaging medium and a region on the target object that corresponds to the respective individual imaging piece. The image of the target object is captured on the imaging medium. Blurring is removed from the captured image using the distances identified for the individual imaging pieces.

9 Claims, 8 Drawing Sheets

OTHER PUBLICATIONS

Naoshi Matsuo et al., "Speaker Position Detection System Using Audio-visual Information," Dec. 1999, XP 000931599, pp. 214–220.

IBM Corp., "Virtual Keyboard" ISB Tech Disclosure Bulletin, Mar. 1990, vol. 32, No. 10B, XP 000097915, pp. 359–360.

A. E. Savakis et al., "Restoration of Real Defocused Images Using Blur Models Based on Geometrical and Diffraction Optics," 1991, IEEE, pp. 919–922.

Ren C. Luo et al., "Defocusing Blur Restoration in Natural Scene Images for Factual Analysis," Nov. 15, 1993, IEEE, pp. 1377–1381.

* cited by examiner

TECHNIQUE FOR REMOVING BLURRING FROM A CAPTURED IMAGE

RELATED PRIORITY APPLICATION

This applications claims priority to U.S. Provisional Patent Application No. 60/269,731, filed on Feb. 16, 2001. The aforementioned priority application is hereby incorporated by reference for all purposes by this application.

FIELD OF THE INVENTION

The present invention relates to methods and devices for capturing images. In particular, the present invention relates to a technique for removing blurring from a captured image.

BACKGROUND OF THE INVENTION

Devices that capture images are increasingly becoming more technologically advanced. Examples of such devices include traditional cameras, digital cameras, and video recorders. With the advancement of digital technology in particular, such devices are being used to capture images in digitized formats. The use of digital images is becoming more prevalent and diverse. For example, digital images can be stored on computer memory, transmitted over a network, and used on web-pages.

Image capturing devices utilize one or more lenses to focus an image of an object on a medium that captures the image. Image characteristics such as blurriness, brightness and intensity may be determined by factors that include the properties of the lenses, the distance between the lens and the object, and the distance between the lens and the medium.

Blurriness is an image characteristic that detracts from the clarity of a captured image. A blurred image typically appears to be out of focus to a viewer. Blurriness may result when a lens is too close or too far from a target object.

Digital imaging devices capture images on discrete light-detecting sensors, which are sometimes referred to as pixels. For an in-focus image, the lens receives light from one portion of the object to a designated pixel. In a typical digital imaging device, the image of an object is obtained in two dimensions, because imaging of the device does not carry depth information. As a result, it is difficult to correct the out-of-focus blurring.

In the past, several techniques have been proposed to remove blurriness from captured images, but past techniques have several disadvantages. Some devices, such as auto-focus cameras, reduce blurriness of captured images by adjusting the properties of the lens before the image is captured. For example, cameras may move one lens inward or outward in order to reduce the blurriness of the captured image. In such devices, the resulting image of the target object may be in focus, but the surrounding environment may be out of focus because the lens is only adjusted for the object.

Some auto-focus devices are equipped to position the lens based on a measured distance to a target object. This distance may be determined by reflecting a light of an object and using a triangulation technique to determine the distance of the object from the lens. The triangulation technique measures the distance between a limited, discrete number of points on the object and the lens. For example, some devices use only one laser pulse or beam to approximate the distance of entire target object from the lens. Other devices use four corner positions and one center position over the entire scene to determine what distance the target object is from the lens.

Technology has advanced to where imaging devices may be equipped with three-dimensional sensors that accurately measure the distance between discrete regions on the target object and the lens. For digital imaging devices, a three-dimensional sensor can measure the distance between each pixel and a portion of a target object that will reflect light onto that pixel. One type of three-dimensional sensor is described in provisional U.S. Patent application, entitled "Methods for enhancing performance and data acquired from three-dimensional image systems", having Ser. No. 60/157,659, and a filing date of 5 Oct. 1999. This application is incorporated by reference herein in its entirety for all purposes. A device such as described in the Ser. No. 60/157,659 application has the capability of obtaining both intensity and time-of-flight information of a scene it is imaging. The scene may include several objects that are positioned different distances from the imaging device and its pixels.

A basic illustration of an imaging device 800 incorporating a three-dimensional sensor is provided in FIG. 8. The basic components of imaging device 800 include a lens 820, a field-stop (aperture stop) 830 and a two-dimensional imaging medium 840 comprising a plurality of pixels 842. Each pixel 842 uses reflected light to image a region of the target object. In addition, the pixels 842 are adapted to act as a three-dimensional sensor in cooperation with another light source reflecting off the target object. Specifically, each pixel 842 is adapted to use time-of-flight information from the other light source for the purpose of identifying a distance between that pixel and a location on the target object that is being imaged by that pixel. As shown by FIG. 8, a laser source 852 may be coupled or integrated into the device to provide the light source in which pixels 842 detect time-of-flight information. The laser source 852 emits a pulse of laser light 812. A target object 815 reflects light from multiple regions thru the lens 820. The light reflected from the target object 815 is used to create an image in the imaging medium 840. Each pixel 842 images a different portion of the target 815. Furthermore, each pixel 842 of the imaging medium 840 is able to measure both the intensity of the light received and the total time of the light travel from the laser source 852 to the imaging medium. The result is that, for each pulse of the laser, a three-dimensional view of the visible portion of the target object may be obtained.

FIG. 9 illustrates a basic imaging system comprising a lens 910 and an image capturing medium 940. An object 930 maybe located a distance s away from the lens 910. The image capturing medium 940 maybe located at a distance d from the lens 910. The lens 910 has a height a and a focal length f. The "thin-lens" equation may be used to describe the relation among s, d, and f, as follows:

$$1/s + 1/d = 1/f \quad (1)$$

If some point of the object is closer or farther away from lens 910 than the ideal distance s, then the lens 910 will image this portion as a circle with radius c. This circle is sometimes referred to as a Circle of Confusion (CoC).

The largest diameter of an object portion that can be imaged by the three-dimensional sensing system to a particular pixel, without any detectable blurring, is equal to a pixel length x. Therefore, when a target object is in-focus for lens 910, then the portion of the image appearing on pixels of the imaging medium is equal to x. When the target object is out-of-focus, then a portion of an image appearing on a pixel is larger than x. The image portion will then fall on more than one pixel, causing the image of the target object to appear blurred.

Another technique for removing blurring from an image is done using a field stop. The field stop narrows the gap that light can pass, thereby increasing the depth of focus. The use of field stops results in less light passing thru the lens, so that the resulting image is darker or even partly invisible.

SUMMARY OF THE INVENTION

A technique is provided for removing blurring from an image captured by an imaging device. The imaging device may include a lens and an imaging medium comprised of a plurality of imaging pieces. According to an embodiment, the image of the target object is captured on the imaging medium. A distance is determined between individual imaging pieces of the imaging medium and a region on the target object that is being imaged by the respective individual imaging piece. Blurring is removed from the captured image using the distance identified for each of the individual imaging pieces.

Embodiments of the invention may be implemented through use of hardware, firmware, and/or software.

An embodiment of the invention may be implemented on a digital camera or similar device, using a combination integrated circuits and software. Techniques under the invention may alternatively be implemented on other types of computer-readable mediums, such as computer systems equipped with camera-type peripheral devices.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1:
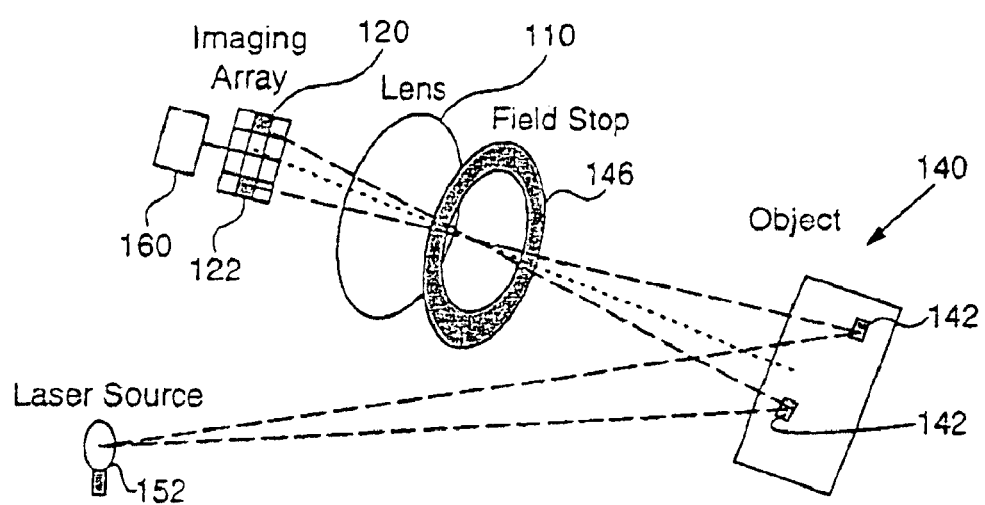
FIG. 1 illustrates a system for removing blurring from a captured image, under an embodiment of the invention.

Embodiments of the invention describe a technique for removing blurring from a captured image. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

According to embodiments of the invention, a technique is provided for removing blurring from an image captured by an imaging device. The imaging device may include a lens and an imaging medium having a plurality of imaging pieces.

As used herein, an image is "captured" when light reflected of a target object is recorded on an imaging medium.

An "imaging medium" is any medium that can record reflected light for purpose of creating an image of the target object. An example of an imaging medium includes an array of light-sensitive pixels, as used on digital cameras. Another example of an imaging medium includes a substrate of film used to form pictures on traditional cameras. In one application, each pixel may record red-blue-green light to form a color or black and white image.

An "imaging piece" is a discrete portion of an imaging medium that records reflected light from a specific region or point on a target object. An example of an imaging piece is a pixel in an array of pixels.

According to one aspect of the invention, each pixel on an array of pixels captures light reflected from different regions of the target object. When the image is not blurred, each pixel in the array captures light from a corresponding region on the target object. When the image is blurred, multiple pixels that surround one another capture light reflected from the same region on the target object.

Accordingly, an embodiment of the invention provides that distances are determined between individual imaging pieces forming an imaging medium and corresponding regions of the target object being imaged by the respective imaging pieces. If the image provided by the imaging piece is in-focus, light reflected from the corresponding region of the target object is captured substantially by that one imaging piece. The image may be captured on the imaging medium using multiple imaging pieces. Blurring may be removed from the captured image using the distances identified for the individual imaging pieces.

According to another aspect, blurring is removed from the captured image by determining, for each individual imaging piece, (i) a primary image component captured from the corresponding region of the target object for that imaging piece and (ii) adjacent image components captured on one or more adjacent imaging pieces to that imaging piece, where each adjacent image component is attributable to the region of the target object that is imaged primarily by the corresponding adjacent imaging piece.

In another aspect, for each imaging piece in which the primary image component is determined, blurring is removed from a captured image by determining a secondary image component. The secondary image component corresponds to a region of the target object that has a primary image component captured on one or more of the adjacent imaging pieces to a respective imaging piece being considered.

In an embodiment, removing blurring from the captured image includes, for each imaging piece in which the primary image component is determined: (i) adding to a value of the primary image component to compensate for a value of the one or more adjacent image components to that imaging piece; and (ii) subtracting from a value of the primary image component to compensate for a value of the secondary image component captured on that imaging piece.

B. System Description

FIG. 1 illustrates a system for removing blurring from a captured image, under an embodiment of the invention. The system includes a lens 110 and a pixel array 120 formed by a plurality of pixels 122. The pixel array 120 corresponds to an image capturing medium. A target object 140 is comprised of a plurality of regions 142, each of which are positioned some distance from lens 110. A field stop 146 maybe positioned between lens 110 and the target object 140.

According to an embodiment of the invention, the system is equipped with a three-dimensional sensor to determine the distance between individual pixels 122 in the pixel array 120 and corresponding regions of a target object 140 being imaged by the individual pixel. The three-dimensional sensor may be formed by a combination of individual pixels 122 and a light source 152. Each pixel 122 may be adapted to detect time-of-flight information for a light beam that is generated by the light source 152, and reflected off a corresponding region 142 of the target object 140 onto that pixel. Each region 142 on target object 140 is assumed to correspond to a particular pixel 122 if that region is imaged substantially by that one pixel. When target object 140 is moved out-of-focus range, an image portion captured by individual pixels 122 appear blurred and out-of-focus. The light source maybe provided by a laser 152, which pulses beams to the target object 140 for purpose of reflecting the beams to the pixels 122.

A correction mechanism 160 is coupled to pixel array 120 to determine the distance between each pixel and its corresponding region 142 on the target object. The correction mechanism determines the distances using the time-of-flight information indicated by the individual pixels. The correction mechanism 160 removes or reduces blurriness from out-of-focus images captured on individual pixels 122 using the determined distances.

In one embodiment, the light source 152 is a laser that is pulsed to reflect off of the corresponding region 142 of each pixel 122 in pixel array 120. The pixels 122 measure both the intensity of the light received from the light source 152, and the time-of-flight for the light to travel from the light source 152 to the pixel array 120. In this way, the distance between each pixel 122 and its corresponding region 142 or target object 140 is determined.

If the captured image is out-of-focus, the image captured by an individual pixel 122 for its corresponding target region 142 will be blurred. As will be described, the image captured by an individual pixel 122 for its corresponding target region 142 may actually appear on multiple pixels 122 when the captured image is blurred. The distance between that pixel 122 and its corresponding target region 142 will be greater (or less than) the range in distance required for the captured image of that target region 142 to be in focus.

According to an embodiment, the correction mechanism 160 corrects the blurring of the image captured on each pixel 122 using the distance identified by individual pixels 122 and each pixel's corresponding target region 142. The result is that the collected image on the pixel array 120 from all of the pixels 122 is corrected so that an image that is captured with blurring become clear.

The correction mechanism 160 may be implemented as hardware, firmware, or software. In one embodiment, correction mechanism 160 corresponds to a programmed processor. The correction mechanism 160 may be configured to execute one or more methods described with FIGS. 2–6. In one particular embodiment, relatively inexpensive integrated circuit design is used to implement the mechanism on pixel array 120.

Among other advantages, embodiments of the invention correct for blurring without having to adjust the lens 110, or move the lens 110 relative to the imaging medium 120. Rather, a distance measured between each pixel 122 and its corresponding target region 142 is used to remove blurring from the image captured by each pixel 122. Thus, the correction may occur after the image is captured.

C. Method for Removing Blurring from a Captured Image

Figure 2:
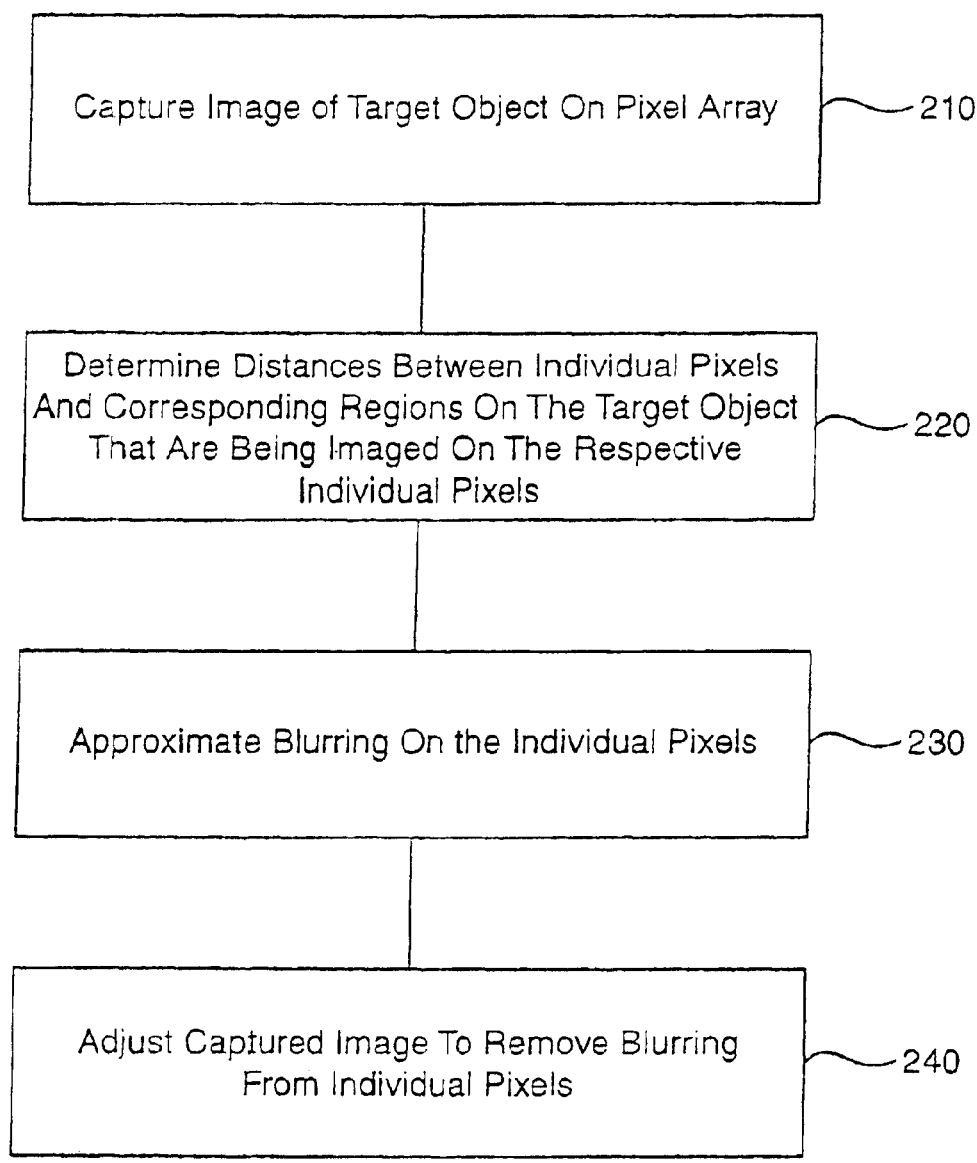
FIG. 2 illustrates a method for removing blurring from a captured image, under an embodiment of the invention.

FIG. 2 illustrates a method for removing blurring from a captured image, under an embodiment of the invention. For purpose of description, a method such as described with FIG. 2 may be implemented on a system such as described with FIG. 1.

In step 210, an image is captured on the pixel array 120. If the image is in focus, then the individual pixels 122 substantially capture an image from only the target region 142 corresponding to that pixel 122. But, as described herein, when the image is blurred, the image captured from each target region 142 is distributed over multiple pixels 122.

In step 220, a pixel distance is determined for each pixel 122 of the pixel array 120. The pixel distance may correspond to a distance between a respective individual pixel and a corresponding region 142 of the target object 140 being imaged on that pixel.

In step 230, blurring on each pixel 122 is approximated. As will be described, blurring may be approximated from the captured image of each target region 142 being distributed over multiple pixels 122. In addition, blurring may be approximated from each pixel 122 having part of the captured image from the target region 142 corresponding to an adjacent pixel 122.

In step 240, the image captured by each pixel 122 is adjusted to remove the blurring approximated on that pixel. This may involve adjusting pixel characteristics that include brightness intensity.

D. Individual Pixel Adjustment to Remove Blurring

Figure 3:
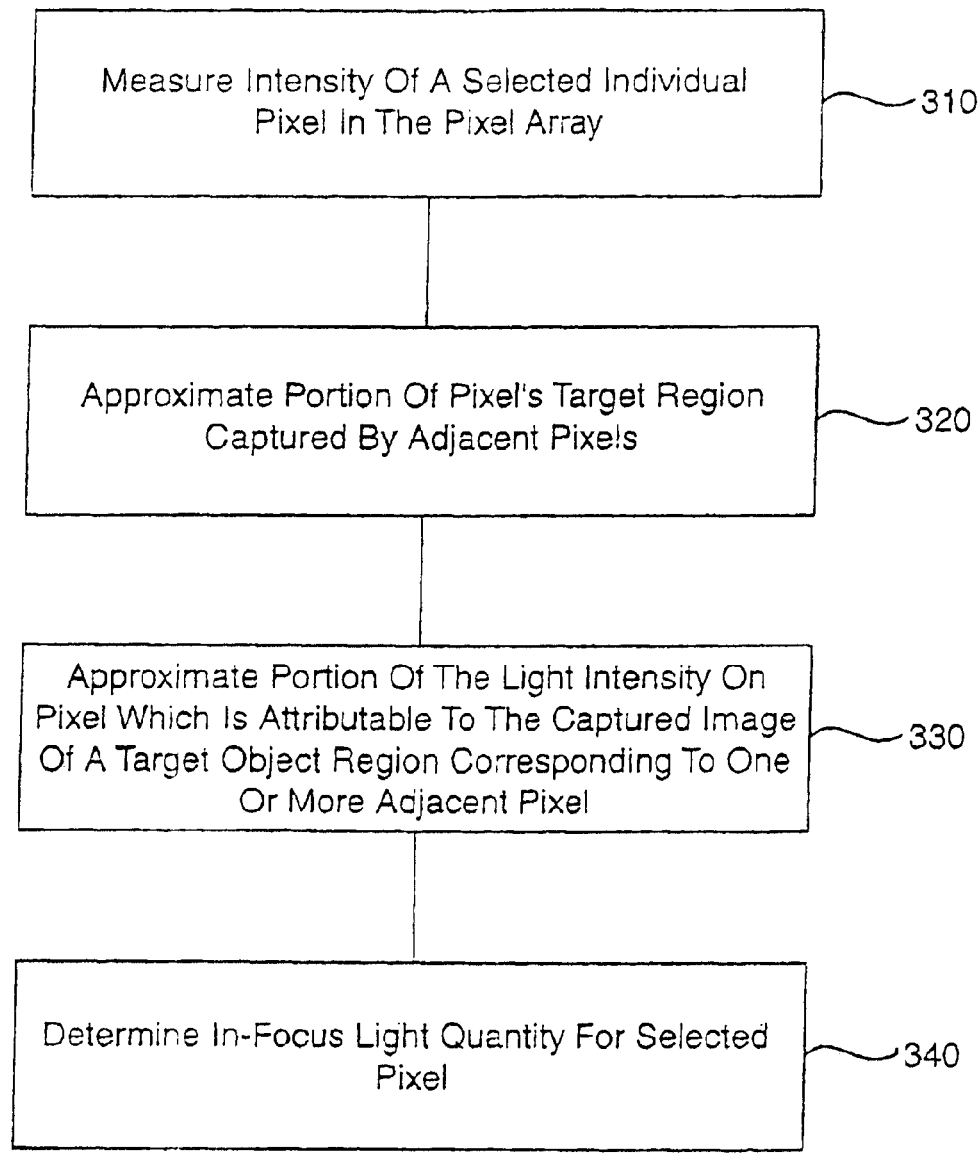
FIG. 3 illustrates a method for adjusting individual pixels to remove blurring, under an embodiment of the invention.

FIG. 3 illustrates a method for adjusting individual pixels to remove blurring, under an embodiment of the invention. The method may be performed after the image is captured using, for example, the correction mechanism 160 (FIG. 1). Steps detailed in FIG. 3 are performed for individual pixels in the imaging array 120 after an image is captured on the pixel array 120. Reference to numerals in FIG. 1 is intended to illustrate exemplary components for use with an embodiment of the invention.

In step 310, the intensity of a selected pixel 122 forming the pixel array 120 is measured. This value may be measured using light sensors or other components internal to the system.

When the image appearing on selected pixel 122 is out-of-focus, the target region 142 of that pixel is captured by multiple pixels. In step 320, the portion of that pixel's target region 142 which is captured by adjacent pixels is approximated. This portion is one of the values that is attributable to blurring on the selected pixel.

When the image on imaging array 120 is out-of-focus, the selected pixel 122 will contain portions of the image captured from target regions 142 corresponding to other adjacent pixels. In step 330, the portion of the light intensity measured on the selected pixel 122 which is attributable to the captured image of a target region of one or more adjacent pixels is approximated. This portion is another of the values attributable to blurring on the selected pixel.

Figure 4A:
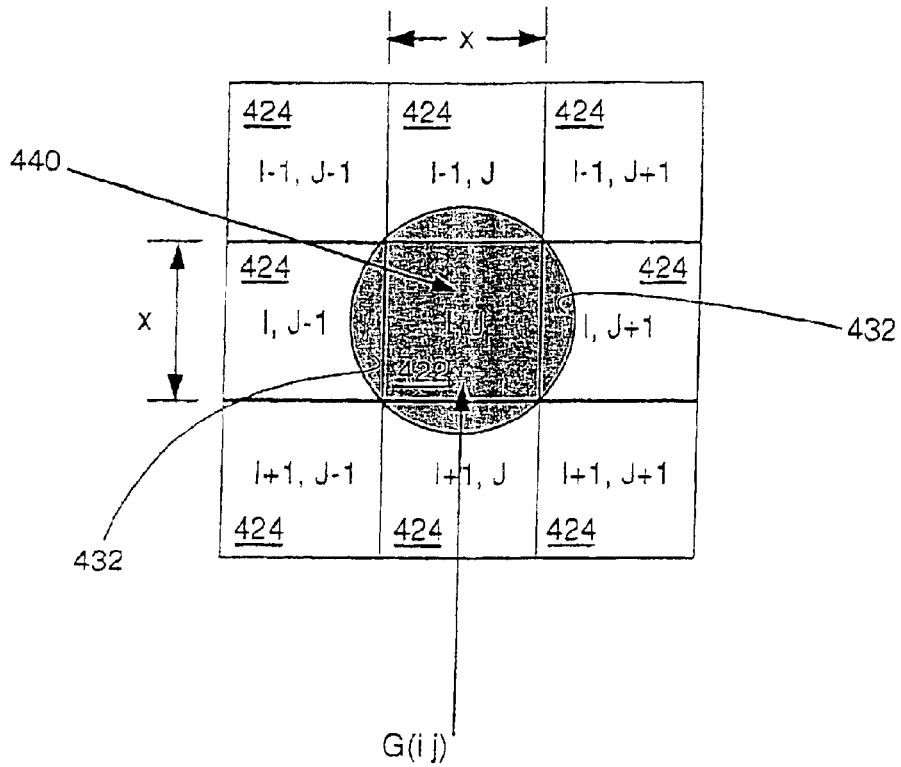
FIGS. 4A and 4B illustrate examples of the blurring quantities determined in FIG. 3.
Figure 4B:
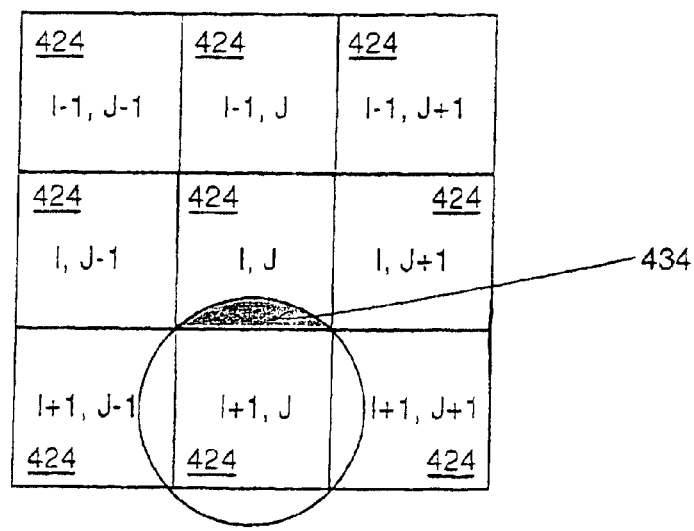

In this manner, a method such as described with FIG. 3 recognizes that each selected pixel 122 is an adjacent pixel for other pixels, and consequently may have portions of captured images corresponding to its adjacent pixel. As shown by FIGS. 4A and 4B, it is possible, for example, for one pixel to have portions of captured images from a target region 142 of eight adjacent pixels. Thus, the light intensity or quantity of the selected pixel may include image contributions from nine target regions 142, where eight of those regions are for adjacent pixels.

In step 340, an in-focus light quantity is determined for the selected pixel 122. This light quality is based on the measured pixel intensity in step 310, the blurring quantity approximated in step 320, and the blurring quantity approximated in step 330.

FIGS. 4A and 4B illustrate examples of the blurring quantities determined in FIG. 3. FIGS. 4A and 4B illustrate an imaging array 420 of pixels 422.

In FIG. 4A, blurring attributable to an image of a target region for a selected pixel being captured by multiple adjacent pixels is illustrated. A selected pixel 422 designated by coordinates (i,j) include eight adjacent pixels 424, having coordinates (i+1,j), (i+1,j+1), (i+1,j−1), (i−1,j), (i−1,j+1), (i−1,j−1), (i,j+1), and (i,j−1). If only the reflection of the target region of the selected pixel (i,j) 422 is considered, then a captured image portion 440 from the selected pixel's corresponding target region is captured primarily by the selected pixel 422. If the captured image is in-focus, then a radius of captured image portion 440 is less than or equal to length and width dimensions of selected pixel 422, shown in FIG. 4A by x. If the captured image is out-of-focus, each of the adjacent pixels 424 may contain a portion 432 of the image captured from the region of the target object corresponding to the selected pixel 422. In an embodiment such as described with FIG. 3, the portion of the image captured by adjacent pixels 424 is approximated in step 320.

In FIG. 4B, blurring on selected pixel 422 that is attributable to an image of a target region captured from one of its adjacent pixels (i+1,j) 424 is illustrated. Each adjacent pixel 424 has its own corresponding target region. When the image is in-focus, that adjacent pixel's target region reflects light that is captured substantially by only that adjacent pixel. When out-of-focus, that adjacent pixel's target region reflects light that is captured by other pixels, including selected pixel 422. If, for selected pixel 422, only the reflection of the target region corresponding to one of its adjacent pixels (i+1,j) is considered, then when the captured image is out-of-focus, a portion 434 of the target region corresponding to that adjacent pixel 424 is captured by selected pixel 422. If captured images from all of the adjacent pixels were considered, then when a captured image is out-of-focus, selected pixel 422 may have portions of captured images from up to eight other adjacent pixels 424.

For selected pixel 422, the captured image portion 440 from the region of the target object corresponding to the selected pixel 422 is termed the primary image component for that pixel. The portions 432 of the captured image lost to adjacent pixels 424 as a result of blurriness is termed as an adjacent image component for that pixel. The portions 434 as a result of captured images from other adjacent pixels is termed as a secondary image component for that pixel.

E. Analytical Method for Removing Blurring from a Captured Image

Figure 5:
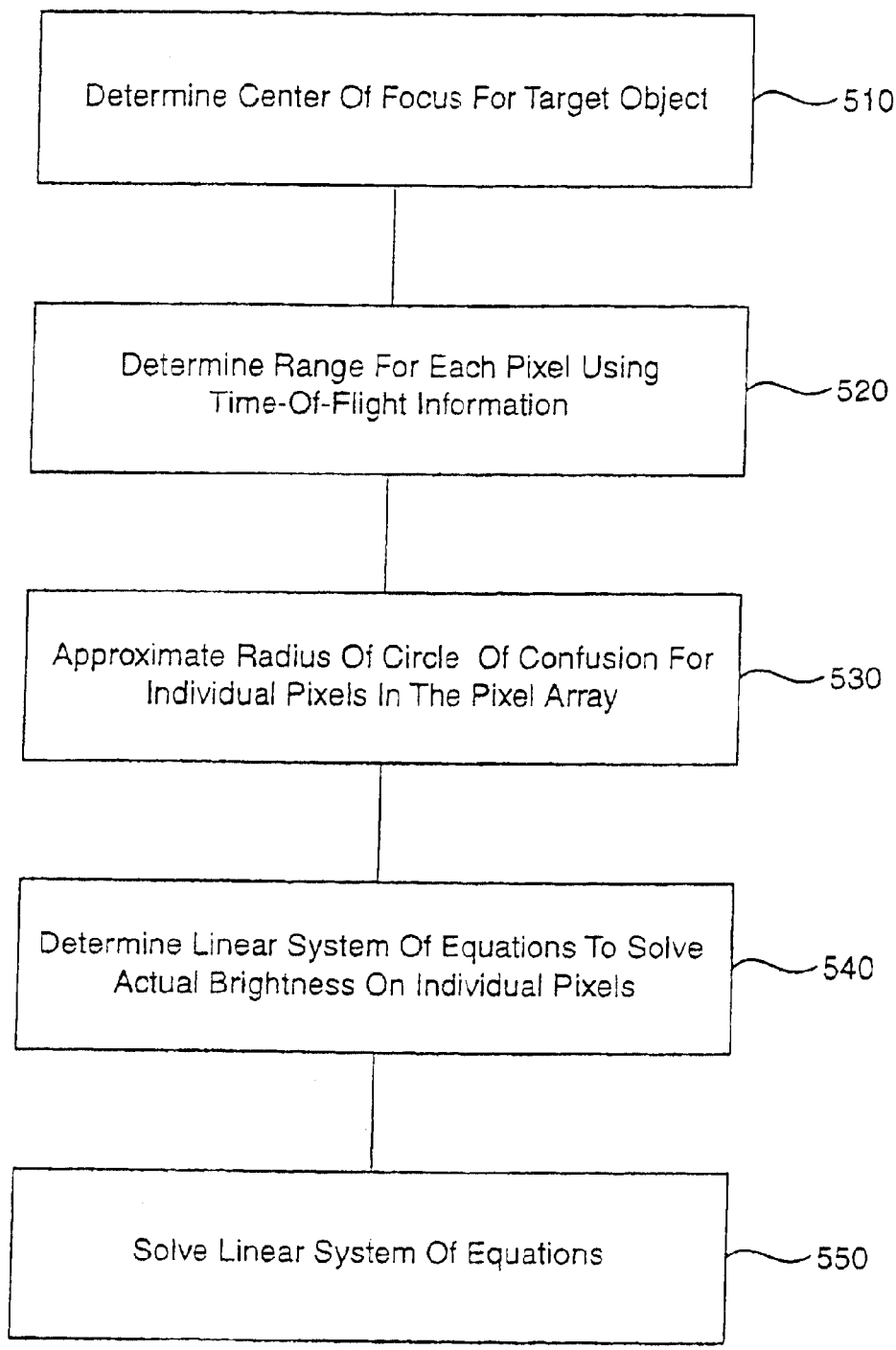
FIG. 5 illustrates an analytical method for removing blurring from a captured image, under one embodiment of the invention.

FIG. 5 illustrates an analytical method for removing blurring from a captured image, under one embodiment of the invention. According to an embodiment such as described with FIG. 5, the blurring in a captured image can be completely removed if the distance between each pixel and that pixel's target region is known. The distance between each pixel and that pixel's target region may be determined from time-of-flight information obtained from a three-dimensional sensor device, such as described in provisional U.S. patent application Ser. No. 60/157,659. A method such as described in FIG. 5 assumes that such distances for individual pixels of an imaging device is known. Furthermore, the imaging medium is assumed to be an array of pixels. Reference to numerals in FIG. 1 are provided for illustrative purposes only.

In step 510, the Center of Focus is determined for target object 140 positioned a distance from lens 110. The Center of Focus may be determined using a thin-lens formula:

$$s=d*f/(d-f) \quad (2)$$

In Equation (2), f is the focal length, d is the distance between the lens 110 and the pixel array 120, and s is the Center of Focus.

In step 520, the range for each pixel 122 is determined using the time-of-flight information detected for that pixel. A time-of-flight value recorded for each pixel may be provided by the relationship:

$$\text{Time-of-flight}=(l'+s'+d')/c \quad (3)$$

In Equation (3), l' is the distance between light source 152 and the region 142 of a target object corresponding to that particular pixel 122. As mentioned, the term c is the radius of the Circle of Confusion for the particular pixel. The term s' represents the distance from the region of the target object 140 to the lens 110. The term d' represents the distance from lens 110 and a center of the pixel array 120.

Since l' is unknown or hard to calculate, an approximation may be made to determine its value in Equation (3). If l' is very small compared to s', and d' is smaller than s', then the following relationship will be true:

$$\text{Time-of-flight}=2*s'/\text{Speed of Light} \quad (4)$$

Then s' can be expressed as $$s'=\text{Time-of-flight}*\text{Speed of light}/2 \quad (5)$$

The distance s' may be determined for each pixel 122 of the pixel array 120. These distances may be determined and stored as a two-dimensional matrix whose elements are determined using the following relationship:

$$S(i,j)=\text{Time-of-flight}(i,j)*\text{Speed of light}/2 \quad (6)$$

The matrix S represents a matrix of s' for individual pixels 122 in the array of pixels 120.

In step 530, the radius c of the Circle of Confusion is approximated for individual pixels 122 in the pixel array 120. The radius c can be derived for when the individual pixel distance S(i,j) to the corresponding region 142 of the target object 140 is greater than the Center of Focus, and when S(i,j) is less than or equal to Center of Focus S. The following relationships may be used to approximate and store the radius c for individual pixels 122 in the pixel array 120:

$$C(i,j)=$$

If $S(i,j)>S$ then $C(i,j)=a(1-k)/k$

If $S(i,j)<=S$ then $C(i,j)=a(k-1)/(2-k)$

Where $k=d*(S(i,j)-f)/(S(i,j)*f) \quad (7)$

In the presence of blurring, the distance d may change slightly, but the effect on the Circle of Confusion for each pixel may be assumed to be negligible.

In step 540, a linear system of equations is determined to solve actual brightness on individual pixels. The measured brightness of a pixel can be expressed by the relationship:

$$\text{MeasureIntensity}(i,j) = H(i,j) * \text{RealIntensity}(i,j) + \text{Sum}(G(k,l) * \text{RealIntesity}(k,l)) \quad (8)$$

The term $G(i,j)$ is the ratio of the area of the pixel to the Circle of Confusion for that pixel (i.e., $CoC(i,j)$ of pixel $(i,j)$). The term $H(k,l)$ is the ratio of the overlapping area of the Circle of Confusion for an adjacent pixel to the pixel $(i,j)$ (i.e., $CoC(k,l)$), where $(k,l)$ are the indices of those adjacent pixels whose Circle of Confusion overlaps with the pixel at $(i,j)$ position. In this manner, Equation (8) accounts for each pixel's (i) primary image component, corresponding to the measured intensity on a pixel from the amount of light reflected from that pixel's region 142 on target object 140, and (ii) secondary image component, derived from light reflected by the circle of confusion from adjacent pixels which overlap with that pixel.

Since $G(i,j)$ & $H(k,l)$ are coefficients of pixel $(i,j)$, the Equations (8) accounts for the fact that light intensity from the Circle of Confusion of any one pixel may not be uniform. It is assumed that the profile of intensity distribution over the circle is known.

The Equations (8) form a system of linear equations in the form of $Ax=b$ where A is a matrix composed in each dimension of the total number of pixels. The matrix A holds coefficients $G(i,j)$ and $H(k,l)$. The vector x holds unknown variables $\text{RealIntensity}(i,j)$. The vector b holds the values provided by $\text{MeasuredIntensity}(i,j)$. Both vectors are of the size of (total number of pixels)×(1).

In step 550, the set of linear equations are solved using existing analytical existing techniques, such as Gaussian Elimination, or Successive Over Relaxation (SOR). Since the matrix is band shaped, band matrix inversion routines may be used to obtain the inverse of the matrix in faster execution times.

F. Removing Blurring from Images Originally Captured on a Printed Medium

Figure 6:
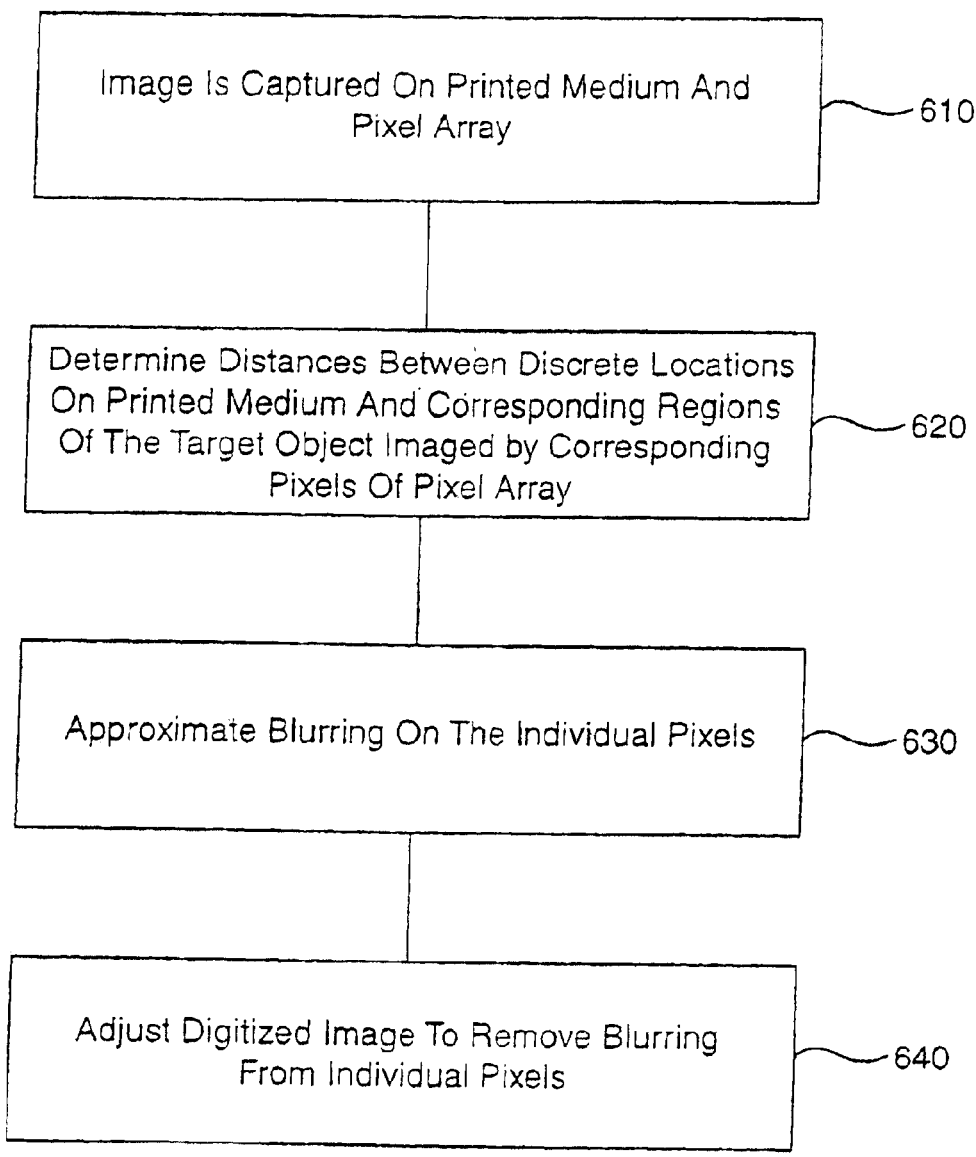
FIG. 6 illustrates a method for removing blurring from an image originally captured on a printed medium, under another embodiment of the invention.

FIG. 6 illustrates a method for removing blurring from an image originally captured on a printed medium.

As with other embodiments, reference to elements of FIG. 1 are intended for illustrative purposes only. For an embodiment such as described with FIG. 6, the imaging medium is assumed to be a photographic imaging medium, such as used on cameras that use film. The correction mechanism 160 couples with the pixels 122 or other sensors of the device to record distances for discrete locations on the film.

In step 610, an image is captured on a printed medium and on a pixel array 120. The printed medium may correspond to, for example, a photograph. The pixel array may be positioned adjacent to the printed medium within the same device. Pixels in the pixel array 120 may detect time-of-flight information for a beam of light, as described with FIG. 1.

In step 620, the distance between each of the plurality of discrete locations on the imaging medium used to create the photograph and corresponding regions on the target object being imaged by corresponding pixels of the pixel array 120 is determined. For example, light source 152 may be used to reflect off the target object. The image may be captured by the printed medium. The pixel array 120 may also capture the image, and also record time-of-flight information for each pixel 122.

In step 630, blurring on individual pixels in the array is approximated. Then in step 640, the digitized image is adjusted to remove blurring from individual pixels.

G. Alternative Embodiments

While embodiments described with FIGS. 1–6 describe a three-dimensional sensor being incorporated into an imaging device using pixels that also image the target object, other embodiments of the invention may use separate pixel arrays for purpose of imaging the target object and for purpose of ranging portions of that imaging medium to corresponding regions of the target object.

Figure 7:
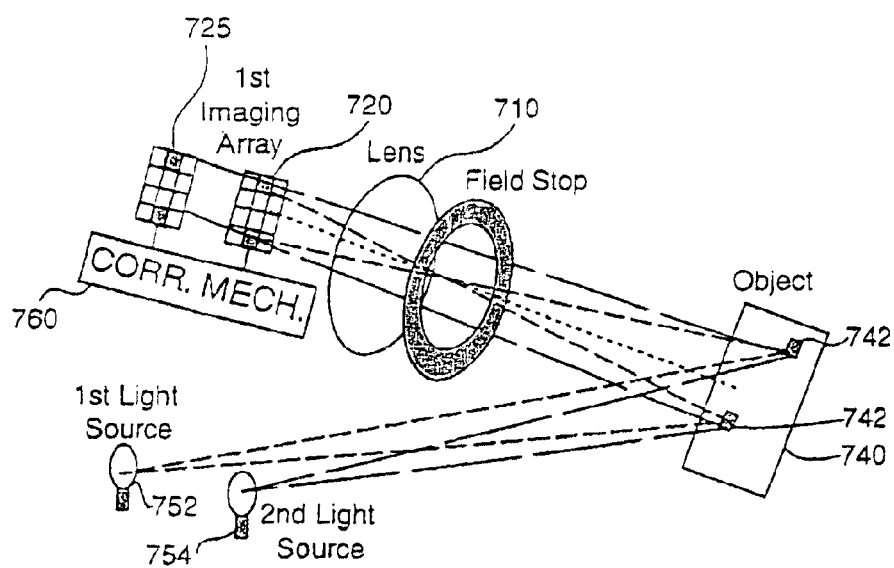
FIG. 7 illustrates a system for removing blurring from a captured image using multiple imaging mediums, under an embodiment of the invention.
Figure 8:
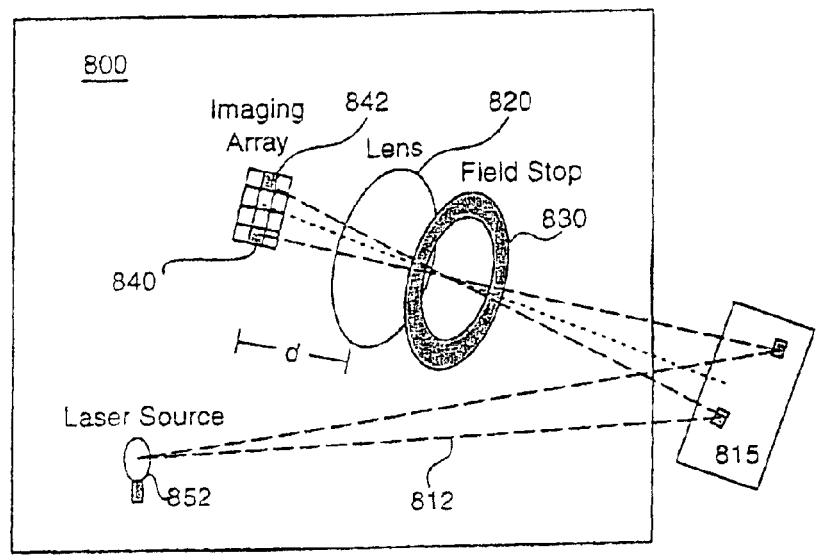
FIG. 8 illustrates a prior-art imaging device incorporating a three-dimensional sensor.
Figure 9:
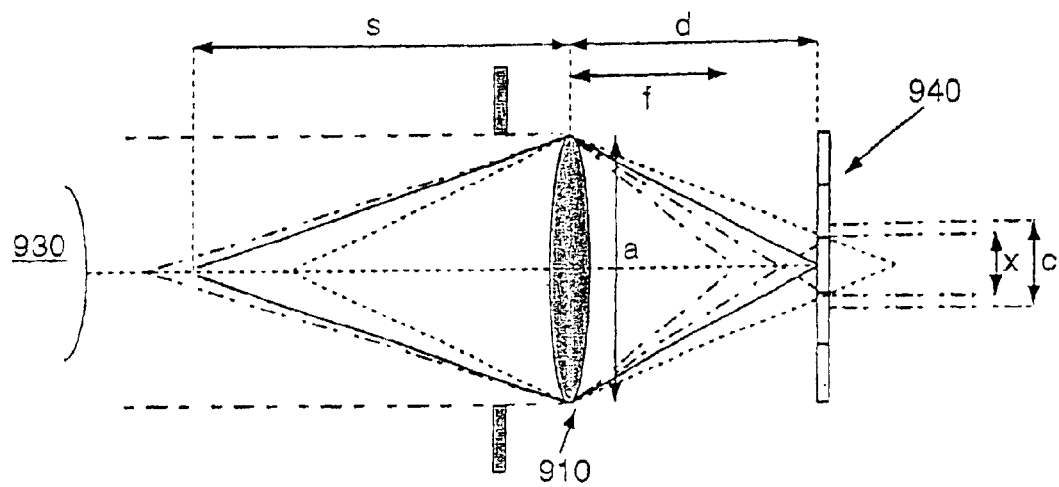
FIG. 9 illustrates a basic, prior-art imaging system comprising a lens and an image capturing medium.

FIG. 7 illustrates another embodiment in which an imaging device includes a first pixel array 720, and a second pixel array 725 positioned adjacent to the first pixel array. One or more lenses 710 may receive light originating from the multiple light sources, including a first light source 752 and a second light source 754.

Each pixel array 720, 725 may incorporate a different type of light sensor. Pixels in the first pixel array 720 may be adapted to detect visible light reflected from the target object 740 for purpose of imaging the target object. For example, each pixel may record light in the red-blue-green spectrum to form a color or black and white image. Individual pixels of the second pixel array 725 may be adapted to detect time-of-flight information from a light source being reflected off the target object 740 and onto pixels in the second pixel array 725. As discussed with other embodiments, the second pixel array 725 may be used for determining the distance between pixels in the second pixel array and regions of the target object 740 corresponding to those pixels. Each of those regions 742 maybe illuminated primarily on one of the pixels in the first pixel array 720. Furthermore, light reflected on each of those regions 742 for purpose of determining that region's range is detected primarily by individual pixels in the second pixel array 725.

Accordingly, a first light source 752 may be used to illuminate target object 740 for first pixel array 720. The first light source 752 may, for example, be sunlight, fluorescent, or incandescent in nature. A second light source 754 may be used to determine range information by reflecting light off the target object 740 and onto the second pixel array 725. The second light source 754 may be a laser.

In one embodiment, second pixel array 725 may be configured so as to approximate distance information between corresponding pixels in the first pixel array 720 and corresponding regions 742 of the target object 740. In another embodiment, the second pixel array 725 may be configured to determine distance information for pixels in the second pixel array, but the distance information for each pixel may be applied to pixels in the first pixel array. In either case, approximations of distances determined by pixels in the second pixel array 725 may be used to correct blurriness in the image captured by first pixel array 720. A correction mechanism 760 may be coupled to the first pixel array 720 and the second pixel array 725 to correct the blurriness of the target object's image captured on the first pixel array 720.

In another embodiment, blurriness may be corrected in both first pixel array 720 and second pixel array 725. In one embodiment, distance approximated by individual pixels in second pixel array 725 may, for example, be used to correct blurriness of the light being reflected from the second light source 754. The approximated distance may then be recalculated based on the correction in the blurriness of the second pixel array 725. The recalculated distance may then be used to correct for blurriness in the first pixel array 720.

While embodiments of the invention specifically mention using time-of-flight information to detect range information for individual pixels, other embodiments may use other type of information to detect the distance between individual pixels and regions on the target object being imaged by those pixels. For example, individual pixels may be sensitive to brightness or other light property characteristics. The correction mechanism 160 (FIG. 1) may extrapolate the other light property characteristics on each pixel to determine the range of that pixel to the region on the target object being illuminated by that pixel.

H. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An imaging device for capturing an image of a target object, the imaging device comprising;
   a light source configured to reflect a light beam off of the target object;
   an imaging medium comprising a plurality of imaging pieces to capture the image of the target object, wherein at least some of plurality of imaging pieces are adapted to sense the light beam in order to individually determine a distance between that imaging piece and a corresponding region on the target object that is imaged primarily by that imaging piece when the image of the target object is captured;
   a lens to receive light that is sensed by the imaging pieces of the imaging medium;
   a correction mechanism that is configured to remove blurring from the captured image of the target object using the distance determined from the individual imaging pieces;
   wherein the imaging medium is an array of pixels;
   wherein each pixel in the array of pixels captures substantially an image from only the corresponding region of that pixel when the captured image is in-focus;
   wherein the correction mechanism is configured to identify a primary image component and a secondary image component on individual pixels in the array of pixels; and
   wherein the primary image component corresponds to a portion of the image captured from the corresponding region of the target object far the individual pixels in the plurality of pixels, and the secondary image component corresponds to images from the regions of the target object that are primarily captured by adjacent pixels to each of the individual pixels in the plurality of pixels.

2. The imaging device of claim 1, further comprising a plurality of lenses, each lens being configured to receive light that is sensed by the imaging pieces of the imaging medium.

3. The imaging device of claim 1, wherein the correction mechanism is configured to identify an adjacent image component of individual pixels in the plurality of pixels, wherein the adjacent image component for each of the individual pixels is a portion of the image from the corresponding region of the target object for that pixel which is captured by one or more adjacent pixels to that individual pixel.

4. The imaging device of claim 1, wherein for each of the individual pixels in the plurality of pixels, the correction mechanism is configured to add to a value of the primary image component to account for the adjacent image components for that pixel, and to subtract a value from the primary image component to account for the secondary image component on that individual pixel.

5. The imaging device of claim 1, wherein each of the one or more imaging pieces measure time-of-flight information from the light source to a region of the target object being imaged by that imaging piece, and from the portion of the target object to that imaging piece.

6. A method for removing blurring from an image captured by an imaging device, the method comprising:
   capturing an image on a first medium and on a second medium, the first medium comprising a first plurality of pixels and the second medium comprising a second plurality of pixels, wherein individual pixels in the second plurality of pixels each have a corresponding pixel on the first medium;
   for each of at least some of the first plurality of pixels on the first medium, approximating a distance between that pixel and a region of a target object being imaged by one of the individual pixels in the second plurality of pixels that corresponds to that pixel; and
   adjusting the image on the second medium to remove blurring using the approximated distance for the at least some of the first plurality of pixels in the first medium;
   wherein adjusting the image on the second medium to remove blurring using the measured distance includes identifying a primary image component and a secondary image component on individual pixels in the second medium, identifying an adjacent image component for each pixel determined to have the primary image component, adding a value to the primary component to account for the adjacent image components for that pixel, and subtracting a value from the primary image component to account for the secondary image component on that pixel.

7. A method for removing blurring from an image captured by an imaging device, the method comprising:
   capturing an image of the target object on a first medium, the first medium comprising a first plurality of pixels;
   actively reflecting light off the target object and onto a second medium;
   using light reflected onto the second medium to approximate a distance between individual pixels in the first plurality of pixels and a region on the target object being imaged by the individual pixel in the first plurality of pixels;
   adjusting the image on the first medium to remove blurring using the approximated distance for the individual pixels;
   wherein reflecting light off the target object and onto a second medium includes reflecting the light onto a second plurality of pixels forming the second medium; and
   wherein the method further comprises:
   matching individual pixels in the first plurality of pixels to individual pixels in the second plurality of pixels; and
   using light reflected onto the second medium to approximate the distance between individual pixels in the second plurality of pixels and regions on the target object being imaged by the individual pixels in the first plurality of pixels, each of the individual pixels in the first plurality of pixels corresponding to individual pixels in the second plurality of pixels.

8. The method of claim 7, further comprising detecting a blurring quantity for light reflected onto the second medium using the approximated distance for the individual pixels in the second plurality of pixels.

9. The method of claim 8, wherein adjusting the image on the first medium remove blurring is performed after detecting a blurring quantity for light reflected onto the second medium.

* * * * *